Aug. 30, 1966　　　　　B. C. HIGGINS　　　　　3,269,364
AUTOMATIC ADJUSTABLE ELECTRIC CONTROL OF MINERAL
CONTENTS FOR BLOWDOWN IN A BOILER
Filed March 3, 1964
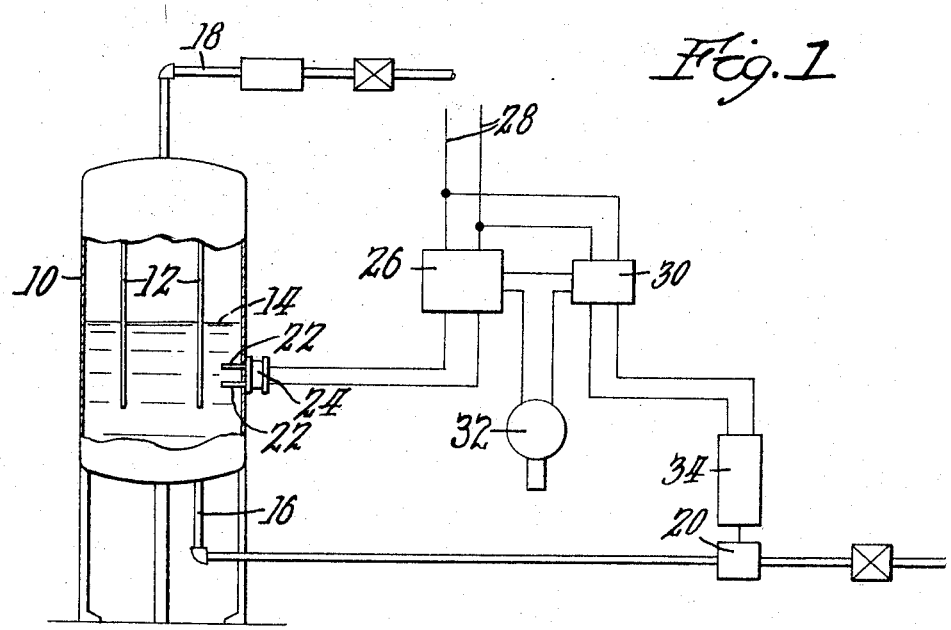
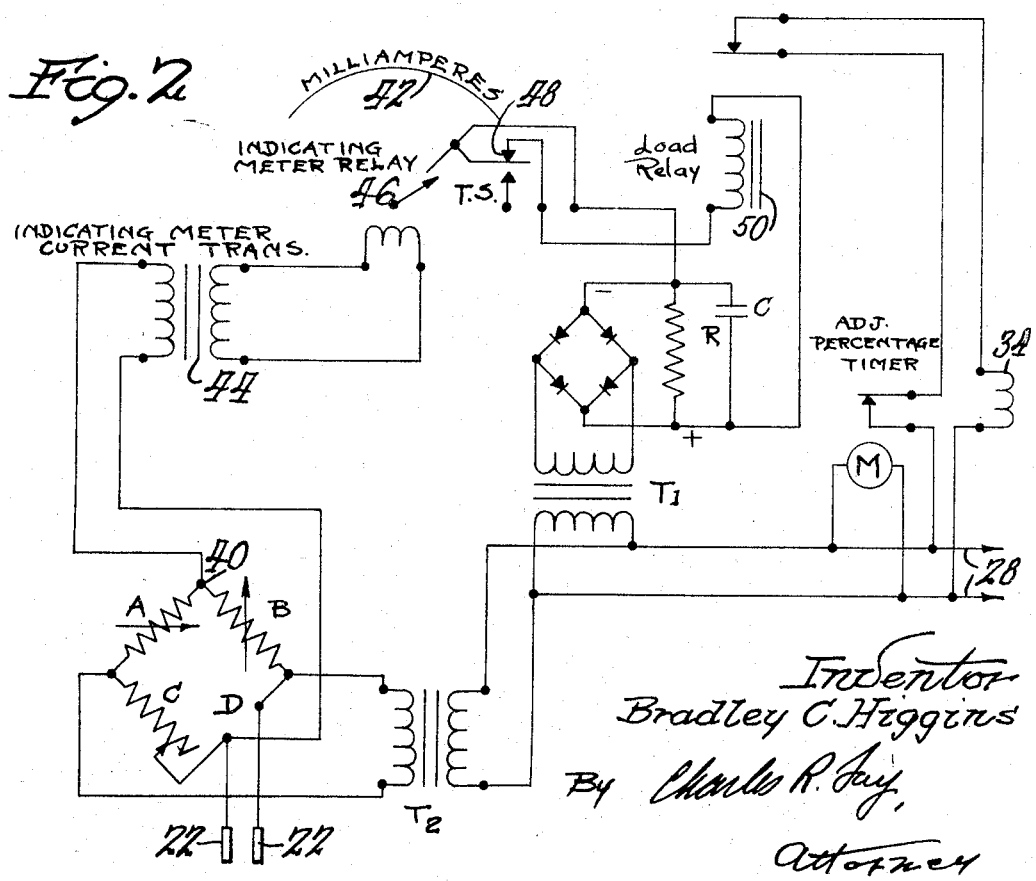
Inventor
Bradley C. Higgins
By Charles R. Fay
Attorney 3,269,364
AUTOMATIC ADJUSTABLE ELECTRIC CONTROL OF MINERAL CONTENTS FOR BLOWDOWN IN A BOILER
Bradley C. Higgins, 200 Gold Star Blvd., Worcester, Mass.
Filed Mar. 3, 1964, Ser. No. 349,077
1 Claim. (Cl. 122—379)

This invention relates to means for controlling the mineralized contents of boiler water and for periodically and automatically discharging or blowing off some of the boiler water which has become too highly mineralized, i.e., electrically conductive for proper operation of the boiler and removal of scale forming and other matter in any boiler. Particularly in electric boilers which include electrodes immersed or partially immersed in the boiler water, it has been found that continued operation of the boiler increases the salt or other solids content of the water, making it more highly electrically conductive so that either the amperage will increase over desired limits or the amperage pre-set will cause excess steam to be produced, lowering the water level in the boiler and exposing the electrodes until the electrodes tend to arc, i.e., the water barely covers the tips of the electrodes. In this situation the electrodes are quickly eroded (dissolving the electrodes further adds minerals to the water causing even faster erosion) because of the fact that the full electric current is impressed upon such a very small area of the electrodes. In flame or heating element boilers, the conductivity being high indicates a build up of scale forming materials and more tendency for this damage and loss in efficiency results. By controlled automatic dumping, these materials can be removed thereby reducing or removing the amount of water treatment necessary.

It is therefore a purpose of the present invention to automatically control the electrical conductivity of the water in the boiler which in turn will regulate the water level around the electrodes to maintain a given area of exposure of the electrode tips with respect to the water and this of course in turn will regulate the steam output and maintain it constant.

Other objects and advantages of the invention will appear hereinafter.

Reference is to be had to the accompanying drawings in which:

FIG. 1 is a schematic diagram illustrating the invention, and

FIG. 2 is a wiring diagram therefor.

Although the present invention may be applied to any kind of boiler, it is illustrated herein as applied to an electric boiler 10 of general or conventional construction and it has especially beneficial results in such a boiler. This boiler is shown in FIG. 1 diagrammatically and it has a plurality of electrodes or other immersed heaters therein at 12, which electrodes are supported and charged from the top and depend into the water, the ordinary water level in the boiler being indicated at 14.

There is a blowdown tube 16 leading from the lower portion of the boiler through which the boiler water can be released to delete the old boiler water of high electrical conductivity and of course an inlet as at 18 is provided with the necessary valves, etc. for providing for decreased conductivity treated water, fresh water from any source, or condensate to take the place of the old boiler water. The outlet may have a main shutoff valve as shown if desired but it also has a solenoid operated valve at 20. With the main shutoff valve open, the valve 20 is usually closed but automatically opened when called upon by the apparatus to be described, to let a certain amount of boiler water to be blown out. At the same time automatic apparatus which is not part of the present invention can be utilized to open the valve at the inlet 18 to an equal extent in order to supply makeup water for the boiler.

There is provided a pair of probe wires which are indicated at 22, 22 and these can be provided in a boiler plug or the like 24 of any desired description. These probes are connected to an amplifier relay of commercial construction indicated at 26. The power supply is at 28 which can be of usual current and this operates through a relay 30 and also a proportioning timer 32 to operate the solenoid. The relay can be of adjustable type so that at a predetermined reading or sensing of the amperage flowing through the boiler water from one probe 22 to the other, the proportioning timer and relay operate to in turn energize the solenoid 34 which opens valve 20 and also closes the same under operation of the proportioning timer.

The actual operation is that the solenoid operated valve at 20 will open for time measured in seconds only since it is not desired to drain all of the boiler water out and replace it with fresh cold water, as this will of course destroy the steam head. On the other hand it is often necessary to release more boiler water than can be done within seconds, but the device is delayed by the proportioning timer so as to operate say for instance once in periods measured for instance by minutes, although a minute or half a minute operation can be utilized if desired.

The timing of the operation of the valve 20 cannot be too rapid as otherwise the boiler water will become roiled, causing such variations in the conductivity of the water as to cause the boiler to operate erratically.

Turning now to FIG. 2, for purposes of illustrating the invention, there is shown a wiring diagram that will operate the apparatus described above. A Wheatstone bridge 40 which employs alternating current is employed and it is run in an unbalanced state. The arms A, B and C are all adjustable to allow a wide range of operation points. Arm D of the bridge is the resistance of the boiler water under control. This resistance is connected to the bridge through the probes 22, 22 which are immersed in the boiler water as described above.

The Wheatstone bridge is adjusted for normal operation as would be indicated by the indicating meter relay 42. This meter reads or senses the unbalance in the bridge and through the current transformer 44 which also acts to isolate the bridge from the rest of the circuit. As the boiler water accumulates minerals, etc. and soluble solids, and the conductivity of the water increases, the indicator 46 of the meter relay rises to a point approaching "above normal." There is provided a movable toggle switch mechanism indicated at TS which is movable along the same radius as the indicating pointer 46 and is part of the meter itself. This toggle switch is snapped by the indicating pointer 46 itself to the high contact 48 completing the circuit to the load relay 50 which then closes the circuit to the solenoid valve 34. The valve 20 then opens, allowing water from the boiler to be discharged at predetermined intervals which are adjustable on a time percentage basis. This allows the operator to set the discharge time in small bursts, thus preventing the boiler from dropping too radically in pressure.

The introduction of fresh water into the boiler by the boiler water level control (not part of this invention) soon begins to drop the water conductivity. The current at the meter relay soon begins to drop off, moving the pointer by the lower end of the toggle switch throwing it to lower scale position, thus breaking the circuit to the load relay and discontinuing the water discharge from the boiler. The circuit is now ready to begin the same cycle upon increase of the water conductivity.

At the meter relay, the lower contact of the toggle switch may be used for controlling the boiler in a negative manner or it can be used to control other boiler apparatus. Adjusting the toggle switch in an upward direction will allow the boiler water to increase in conductivity and lowering the toggle switch downwardly will allow the boiler water to be reduced in conductivity and operate at a new point on the electrical conductivity scale.

Transformer T1 is the supply source to the load relay and meter relay through a rectifier bridge and its filter network R and C. Transformer T2 is a low voltage stepdown transformer used to supply a low voltage source to the Wheatstone bridge.

It will be seen that this invention therefore provides a method and device for controlling the electrical conductivity of the water in any kind of a boiler but which is particularly adapted to electric boilers where it is necessary to maintain the level of the water with respect to the immersed electrodes so as not to increase the steam pressure over a predetermined limit and to prevent burning of the electrodes themselves due to the fact that too small an area of the electrodes is exposed to the water and therefore to a greatly increased amount of current per unit of area of electrode.

Having thus described my invention and the advantages thereof, I do not wish to be limited to the details herein disclosed, otherwise than as set forth in the claim, but what I claim is:

In combination with a boiler including means for heating the water therein, an electrically operated blowdown valve for opening and closing the bottom of the boiler for draining boiler water, a valve for admitting decreased conductivity treated water, fresh water from a source, to the boiler to replace boiler water drawn off, electric probes submerged in the boiler water, and a circuit passing current between said probes to determine the conductivity of said boiler water, of indicating means in the circuit showing the relative conductivity of the water, a relay device in the circuit for operating the blowdown valve periodically upon sensing by the probes of a predetermined conductivity of the boiler water, and a proportioning timer in the circuit operatively connected with respect to the blowdown valve to permit opening of the valve periodically within a given time interval, the length of each period of valve opening and the length of the interval between successive valve openings being correlated such that roiling of the water in the boiler is avoided.

References Cited by the Examiner
UNITED STATES PATENTS 2,453,210  11/1948  Eaton _____ 219—286

FOREIGN PATENTS 315,034  2/1934  Italy.
58,971  6/1925  Sweden.
213,324  5/1941  Switzerland.
254,369  12/1948  Switzerland.

RICHARD M. WOOD, *Primary Examiner.*

ANTHONY BARTIS, *Examiner.*